United States Patent
Wreschner et al.

(10) Patent No.: US 7,302,017 B2
(45) Date of Patent: Nov. 27, 2007

(54) SYSTEM AND METHOD FOR ADAPTIVE MATCHED FILTER SIGNAL PARAMETER MEASUREMENT

(75) Inventors: Kenneth Solomon Wreschner, Chandler, AZ (US); Eric Jay Clelland, Fairfax, VA (US); Christopher Bingham Johnson, Chandler, AZ (US); Keith Petticrew, Apache Junction, AZ (US); Robert Lee Trapp, Scottsdale, AZ (US)

(73) Assignee: General Dynamics C4 Systems, Inc., Falls Church, VA (US)

( * ) Notice: Subject to any disclaimer, the term of this patent is extended or adjusted under 35 U.S.C. 154(b) by 788 days.

(21) Appl. No.: 10/173,756

(22) Filed: Jun. 18, 2002

(65) Prior Publication Data

US 2003/0231719 A1 Dec. 18, 2003

(51) Int. Cl.
*H03D 1/00* (2006.01)
*H04L 27/06* (2006.01)

(52) U.S. Cl. .................... 375/340; 375/341; 375/342; 375/343

(58) Field of Classification Search ........ 375/340–343, 375/344, 345, 136, 273, 285, 377, 350, 257, 375/220, 219, 347, 260, 267; 455/154.1, 455/150.1, 154.2, 158.1, 158.2, 158.3, 158.4, 455/158.5, 161.1, 161.2, 161.3, 166.1, 132; 342/91, 392; 704/249
See application file for complete search history.

(56) References Cited

U.S. PATENT DOCUMENTS

| | | | |
|---|---|---|---|
| 4,578,638 A * | 3/1986 | Takano et al. ........... 324/76.23 |
| 5,075,618 A * | 12/1991 | Katayama ................ 324/76.27 |
| 5,113,409 A * | 5/1992 | Stewart ....................... 375/132 |
| 5,144,226 A | 9/1992 | Rapp | |
| 5,223,742 A | 6/1993 | Schumacher | |
| 5,499,030 A | 3/1996 | Wicks et al. | |
| 5,572,213 A * | 11/1996 | Noneman et al. ............. 342/13 |
| 5,815,117 A * | 9/1998 | Kolanek ..................... 342/442 |
| 5,870,436 A * | 2/1999 | Kolanek et al. ............ 375/316 |
| 5,939,877 A | 8/1999 | Alexander | |
| 6,219,376 B1 * | 4/2001 | Zhodzishsky et al. ...... 375/148 |
| 6,289,207 B1 * | 9/2001 | Hudecek et al. ......... 455/150.1 |
| 6,320,896 B1 * | 11/2001 | Jovanovich et al. ........ 375/130 |
| 6,327,312 B1 * | 12/2001 | Jovanovich et al. ........ 375/316 |
| 6,584,419 B1 * | 6/2003 | Alexander ................... 702/68 |
| 6,898,235 B1 * | 5/2005 | Carlin et al. ................ 375/219 |
| 2002/0106013 A1 * | 8/2002 | Norrell et al. .............. 375/222 |
| 2003/0144840 A1 * | 7/2003 | Ma et al. .................... 704/249 |

FOREIGN PATENT DOCUMENTS

WO      WO 00/51246     8/2000

\* cited by examiner

*Primary Examiner*—Mohammed Ghayour
*Assistant Examiner*—Sophia Vlahos
(74) *Attorney, Agent, or Firm*—Jenner & Block

(57) ABSTRACT

A robust and flexible system for signal parameter measurements in the field of signal processing dynamically uses signal parameters from previous signal detections and parametric priorities to adaptively control and process the signal in an efficient and reliable manner. The system provides for improved fine grain signal parameter measurements through the use of adaptive arbitration to control signal processing. The system improves measurement accuracy for various signal characteristics including pulse width, amplitude, frequency and timing information. The system also provides signal parameter measurements while requiring less power, size, and weight than conventional systems.

24 Claims, 3 Drawing Sheets

SYSTEM AND METHOD FOR ADAPTIVE MATCHED FILTER SIGNAL PARAMETER MEASUREMENT

BACKGROUND OF THE INVENTION

1. Field of the Invention

The present invention relates to a system and method for using adaptive matched filter signal parameter measurement during signal processing and, more particularly, to a system and method that enables improved matched filter parameter measurements at minimal cost by allowing for adaptive control, configuration and dynamic operation of pre-filters.

2. Description of the Related Art

Many communication systems use radio frequency (RF) signals to transfer data. Generally, systems designed to receive and process these RF signals are designed to detect RF signals in a particular range. When a RF signal is received, systems often process the signal before further use. For example, a system may convert analog signals to digital or vice versa. The system may have to optimize the data received or remove extraneous data. After the system processes the data, it may use the data, pass it along to another system or provide it to a user through an interface. Therefore, for a system to work efficiently, it is important to accurately process any received signals. One known method for signal processing is signal parameter measurement. Signal parameter measurement extracts information from the signal to allow the system to process the data more efficiently.

Signal parameter measurement methods are used by many different types of systems, such as radar systems, collection systems, military communications, and some wireless communications. Conventional systems usually only use the presence of signal energy to configure their pre-filters with fixed bandwidth schemes. These fixed bandwidths schemes or the use of tuning approaches produce sub-optimal results that require additional signal filter paths for each measurement. Accordingly, conventional methods often include arcane designs and inefficient architectures.

Some conventional methods optimize the signal parametrics, for example, by using differing bandwidths and tuning and gain control features that depend upon the nature of the parameter to be measured or estimated. However, these methods only improve efficiency slightly. Furthermore, these techniques do not improve the flexibility of such systems to process a variety of signals on the same path. Thus, there is a need for a more optimal and robust system that has the flexibility to handle a variety of different signal types.

SUMMARY OF THE INVENTION

The present invention provides a more robust and flexible system for signal parameter measurements by using adaptive control, configuration, and dynamic operation of pre-filters to enable improved matched filter parameter measurement at minimal cost in terms of size, weight, and power (SWAP) via the use of very large scale integration (VLSI) technology.

The present invention is a novel technique for selection of matched filter inputs for signal parameter measurement functions. It improves the accuracy for all measured signal characteristics such as time-of-arrival, pulse width, signal amplitude, signal frequency, differential measurements between multiple input channels, modulations identification and characterization. In addition to reducing the SWAP, the present invention uses signal parameters from previous signal detections to configure the parameter measurement system to allow for accurate fine grain signal parameter measurement. The joint time-frequency information collected in previous detection blocks is used to set the filters to enable near-matched bandwidth parametric measurements.

Accordingly, the present invention is more efficient than conventional systems. The present system uses adaptive matched pre-filtering based on externally measured information from a previous detection block to determine signal parameter measurements, adaptive controls, and configuration for accurate processing as well as adaptive estimation of certain classes of modulated waveforms to process signals efficiently. In addition to providing more efficient signal processing, the present system may process several types of signals on the same channel.

DETAILED DESCRIPTION OF THE PREFERRED EMBODIMENT

The present invention provides a robust and flexible technique for performing signal parameter measurement. The present system dynamically uses signal parameters from previous processing blocks (i.e. signal detection) to configure the parameter measurement system to allow accurate fine grain signal parameter measurement. In the present invention, joint time-frequency information collected in previous detection blocks is used to configure the filters to enable near-matched bandwidth parameter measurements. Accordingly, the present invention provides a novel approach to signal processing that uses adaptive arbitration to control the processing of a signal.

Figure 1:
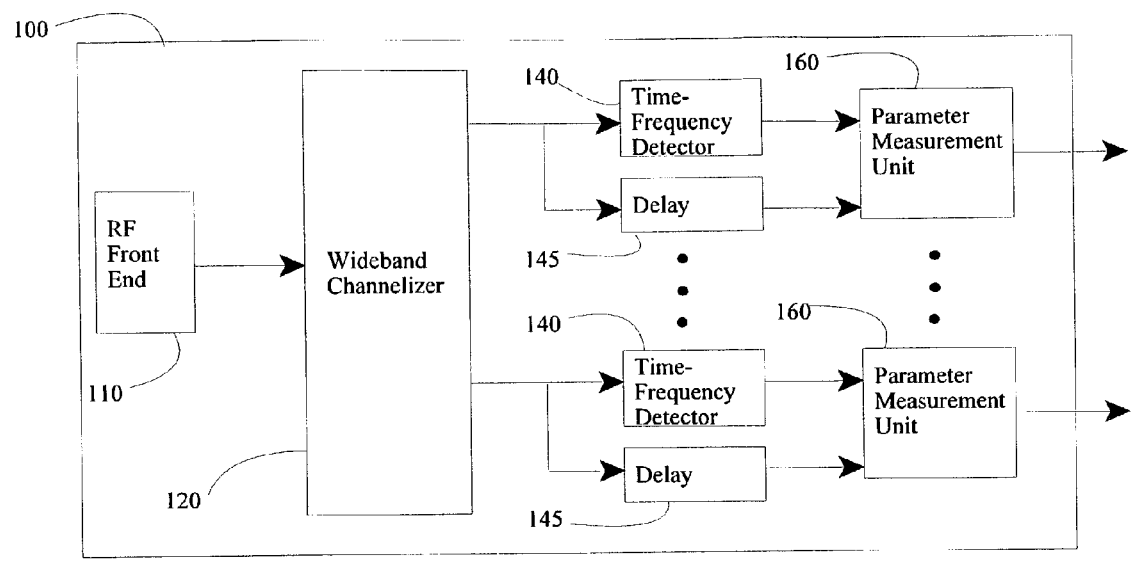
FIG. 1 is a schematic diagram of a signal processing system of the present invention.

Referring to FIG. 1, a system 100 of the present invention can include an RF front end 110, a wideband channelizer 120, a plurality of time-frequency detectors 140, a plurality of delays 145, and a plurality of parameter measurement units 160. RF front end 110 is connected to wideband channelizer 120, which is connected to the plurality of time-frequency detectors 140 and the plurality of delays 145. Each time-frequency detector 140 and each delay 145 is connected to a parameter measurement unit 160. The output for each parameter measurement unit 160 can be passed for use in system 100, another system, or to a user.

A signal typically flows continuously through the system. RF front end 110 receives a signal. RF front end 110 can be a sensor or an antenna or any other device that can receive a signal. RF front end 110 can be configured to receive a certain range of frequencies. If desired, RF front end 110 may convert an analog signal to digital when it is received. RF front end 110 passes the signal to wideband channelizer 120, which segments the signal into smaller bands.

Figure 2:
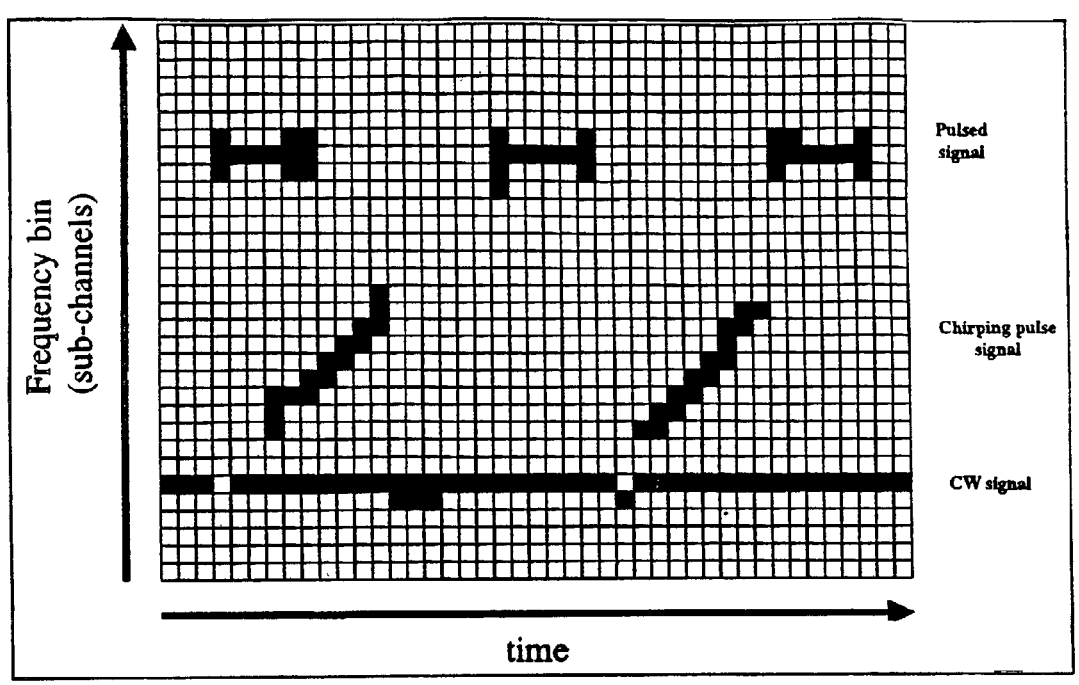
FIG. 2 is an example of a matrix representing energy detection information for use in accordance with the present invention.

In the preferred embodiment, wideband channelizer 120 transmits a matrix of complex valued information (a real and an imaginary part) to a plurality of time-frequency detectors 140 and a plurality of delays 145. The time-frequency detectors 140 generate two matrices of information from the segmented signal. One matrix contains detection information and the other matrix contains power information. As shown in FIG. 2, the detection matrix can represent time on the horizontal axis and frequency on the vertical axis. Each row in the detection matrix can be described as a frequency bin. Each signal may carry different types of signal information on different frequencies. For example, FIG. 2 shows the information from a segmented signal passed from wideband channelizer 120 to time-frequency detector 140. The segmented signal in FIG. 2 carries information about three different signal formats: pulsed signal, chirping pulse signal, and continuous wave (CW) signal. Each cell in the detection matrix can be in either one of two states, detected or not detected. Conventional methods are available to process the segmented signals prior to detection to optimize the detection to the desired signal. For example, processing to determine the energy may be performed prior to detection for pulsed signals. However, for spread spectrum signals, correlative processing may be performed in order to optimize the power at the detector. In the preferred embodiment, if the segmented signal has energy above a threshold level at a particular time and frequency, the corresponding cell for that time and frequency will be filled. The threshold energy level can be a user defined parameter varying depending on the purpose of the system or user criteria.

The power matrix also is defined by frequency and time. The power matrix can have a one-to-one correspondence with the detection matrix. For example, for every cell in the detection matrix, there can be a corresponding cell in the power matrix. A cell in the power matrix stores information about the amount of energy in the segmented signal at a particular time and frequency. Thus, a cell in the power matrix can have a value, although minimal (i.e. below the threshold value), even though there is no pertinent signal information at that time and frequency. The detection matrix is useful because it can show when the energy level is above the threshold value indicating there is pertinent signal information at that time and frequency. Thus, the detection matrix reduces the number of false detections. Furthermore, if the exact power level is needed, the system can quickly determine that information by examining the corresponding cell in the power matrix. In the preferred embodiment, these two matrices are used throughout the system to gather information about a segmented signal.

As shown in FIG. 1, wideband channelizer 120 is connected to a plurality of time-frequency detectors 140. In a preferred embodiment, each channel is associated with its own time-frequency detector 140. Each time-frequency detector 140 can be associated with its own delay 145 and a plurality of parameter measurement units 160. In the preferred embodiment, each time-frequency detector 140 is associated with its own parameter measurement unit 160. Wideband channelizer 120 sends information about a particular segmented signal in the form of the complex voltage matrix and time-frequency detector 140 can examine this information when it is available to process the information. Time-frequency detector 140 generates information about a particular segmented signal in the form of the power and detection matrices when a parameter measure unit 160 is available. Wideband channelizer 120 also typically sends the segmented signal to the appropriate delay 145. Time-frequency detector 140 sends both the matrices and the additional information processed by time-frequency detector 140 to parameter measurement unit 160. When a suitable time expires in delay 145, it will likewise forward the segmented signal to parameter measurement unit 160.

Delay 145 serves to delay the segmented signal until time-frequency detector 140 can process the information from wideband channelizer 120. In the preferred embodiment, delay 145 can delay the segmented signal for a fixed period of time. This period is usually system dependent and may correspond to the amount of time it takes to process a signal in that particular system implementation. Delaying the segmented signal is important because it gives time-frequency detector 140 time to process information. System 100 may use the information generated by time-frequency detector 140 to further process the segmented signal. Without the delay, it is likely that a segmented signal may pass through system 100 before system 100 can use the information from time-frequency detector 140 to further process the segmented signal.

Time-frequency detector 140 extracts certain information from the signal that will be used to further process the signal. Extracted information can include the frequency, time of arrival, the bandwidth, and the amplitude of the signal. Time-frequency detector 140 sends this information along with the matrices to parameter measurement unit 160. After processing information from a segmented signal, time-frequency detector 140 is then available to process the next segmented signal. The next segmented signal can be a different type of signal or a signal that contains a variety of different types of information. For example, after time-frequency detector 140 has processed a non-modulated pulsed RF signal, it can then handle another non-modulated pulsed RF signal or another type of signal such as a modulated linear frequency modulation (FM) signal. It is also possible that multiple signals are carried within the same segmented signal such as a non-modulated pulsed RF signal and modulated linear FM signal.

When time-frequency detector 140 is finished processing the information from the matrices, the matrices and the resulting information are passed to parameter measurement unit 160. After the appropriate delay, delay 145 sends the segmented signal to parameter measurement unit 160.

Parameter measurement unit 160 performs additional processing on the segmented signal. Parameter measurement unit 160 adaptively controls the signal processing. It uses the segmented signal, the information received from time-frequency detector 140, and application specific settings or user criteria to determine a more refined frequency estimate, pulse width and time of arrival of the segmented signal. Parameter measurement unit 160 also may extract other pertinent information from the signal. Such information may include whether the signal is modulated and if so, what type of modulation, or other detection information. In FIG. 1, parameter measurement unit 160 further processes the segmented signal from delay 145 using the information from time-frequency detector 140. Parameter measurement unit 160 then summarizes the processed information into output signal parametrics that are passed on for use in system 100 or provided to some other system or a user.

Figure 3:
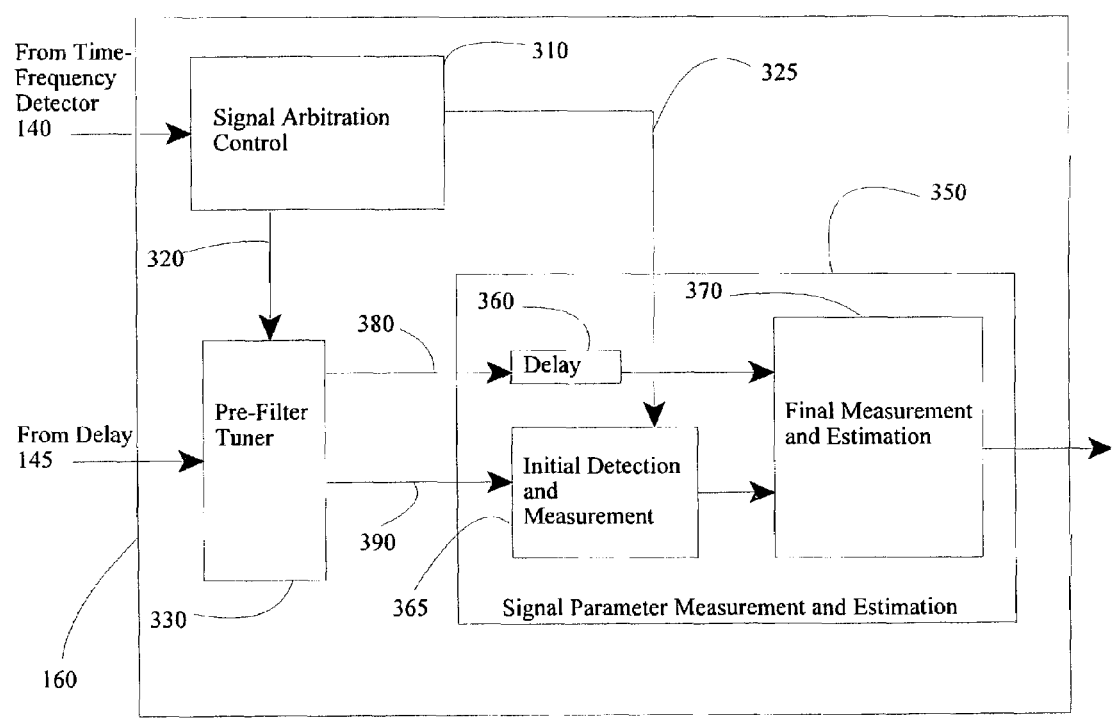
FIG. 3 is a schematic diagram of a parameter measurement unit for use in accordance with the present invention.

A preferred embodiment of parameter measurement unit 160 is shown in FIG. 3. Parameter measurement unit 160 performs three top level functions. Each function is represented by a different unit: a signal arbitration control 310, a pre-filter tuner 330, and a signal parameter measurement and estimation 350. Signal arbitration control 310 adaptively controls pre-filter tuner 330 so as to enhance signal parameter measurement and estimation 350. Signal arbitration control 310 receives external signal time-frequency descriptions of energy above threshold (see the detection matrix) from time-frequency detector 140. Signal arbitration control 310 processes the signal descriptions to adaptively determine coarse level signal parametrics, such as frequency, timing information, optimum signal bandwidth, optimum gain, etc.

In the preferred embodiment, signal arbitration control 310 performs segmented signal association and sorting from information contained in the detection and power matrices from time-frequency detector 140 to determine a coarse estimation of signal parameters (frequency, bandwidth, and gain). Signal arbitration control 310 can then arrange the information by priority (as commanded by external control) to obtain fine grain signal parameter estimates used to adaptively control pre-filter tuner 330, to adaptively control signal parameter measurement and estimation 350 or to adaptively control a plurality of pre-filter tuners/signal parameter measurement and estimations (not shown) located within parameter measurement unit 160.

Application specific settings or user criteria can determine the parametric priorities to be processed by the signal arbitration control function. For example, users may define their criteria such that only the strongest information from a segmented signal is processed further. If two types of signal information are present in a segmented signal (for example, a pulsed RF signal and a CW signal), only the stronger of the two would be further processed within parameter measurement unit 160. Signal arbitration control 310 typically uses the matrices to determine which signal information fits the parametric priorities and extracts the relevant data about that signal. For example, if the CW signal were stronger, signal arbitration control 310 could determine the frequency, timing information, etc. only for that signal. In the preferred embodiment, the system performs parameter measurement only on the highest priority signal and performs no additional processing of the other signal information (i.e. the pulsed RF signal).

Signal arbitration control 310 has two separate outputs: adaptive tuning, bandwidth, and gain control 320 sent to pre-filter tuner 330 and vernier signal adjustment control 325 that is sent to signal parameter measurement and estimation 350. In general, pre-filter tuner 330 filters and down converts the segmented signal uniquely to enhance each type of subsequent measurement. As shown, pre-filter tuner 330 has two inputs: the segmented signal that is sent on a channel from delay 145 and the coarse level signal parametrics determined by signal arbitration control 310. Using the signal parametrics determined by signal arbitration control 310, pre-filter tuner 330 performs a frequency shift of the relevant portion of the segmented signal to a lower frequency. The relevant portion is determined by the parametric priorities and is identified by the signal parametric data from signal arbitration control 310. In the preferred embodiment, the use of delay 145 allows the segmented signal to reach pre-filter tuner 330 in time to be processed using the signal parametrics processed by signal arbitration control 310 relating to that particular segmented signal.

After the frequency shift, pre-filter tuner 330 splits the shifted signal into two instances, passing one instance through a match band filter (not shown) and the other through a wide band filter (not shown). The match band filter produces a narrow band passband with less noise but more distortion on the edge of the pulse. The greater reduction in noise allows for more precise measurements of amplitude, phase, and frequency. The wide band filter produces a larger passband with more noise than a narrower signal but the pulse edges have less distortion. The larger passband provides more precise estimates of timing information and pulse widths because the pulse edges have less distortion. Accordingly, time-of-arrival and pulse width measurements typically are more accurate with larger bandwidths, set relative to signal strength and frequency. As shown, pre-filter tuner 330 has two outputs that lead to signal parameter measurement and estimation 350: narrow band signal 380 from the matched band filter and wide band signal 390 from the wide band filter.

Signal parameter measurement and estimation 350 performs two functions and includes an additional delay mechanism. The functions are initial detection and measurement 365 and final measurement and estimation 370. Initial detection and measurement 365 has two inputs: wide band signal 390 from pre-filter tuner 330 and vernier signal adjustment control 325 from signal arbitration control 310. A vernier signal provides fine grain and/or vernier signal parametric controls such as timing gates, strobe controls, etc. In general, this allows signal parameter measurement and estimation 350 to optimize the output signal parametrics with the parametrics of interest. Vernier signal adjustment control 325 is dependent upon the parametric priorities. It is typically a discrete control signal (e.g. a timing gate). In FIG. 3, vernier signal adjustment control 325 is used by initial detection and measurement 365 to determine when to start its measurement of wide band signal 390. From this measurement, initial detection and measurement 365 calculates a precise measurement of the time of arrival of the signal, including the time it took the pulse to travel through the system, and the pulse width. This information is passed to final measurement and estimation 370.

Matched band signal 380 from pre-filter tuner 330 is delayed by delay 360. Delay 360 holds matched band signal 380 for an appropriate length of time. The delay can correspond to the time it takes for initial detection and measurement 365 to performs its function. Thus, final measurement and estimation 370 typically has the information from initial detection and measurement 365 in time to properly measure the corresponding matched band signal 380 sent from delay 360. Final measurement and estimation 370 uses the information from initial detection and measurement 365 as a discrete signal control (e.g. a timing gate) to determine when to start and stop its measuring of the narrow band signal. Final measurement and estimation 370 typically measures the narrow band passband for amplitude, phase, and frequency information. This final measurement is usually passed for use in system 100, another system, or a user.

Thus, the system allows for a queued set-up of downstream parameter measurement functions to be enhanced based upon initial detection and measurement decisions. A more accurate final measurement of several parameters such as amplitude, phase, and frequency is outputted for use. The final measurement and estimation function also allows for accurate estimations of various parameters, including frequency, modulation detection, etc. in single channel systems.

In an alternative embodiment having multi-channel applications, all the filtered sample streams of the multi-channel system are routed immediately to an initial detection processing function to dynamically determine the reference/absolute channel.

Another alternative embodiment includes routing a subset of all channels to the initial detection and measurement function/unit.

In another alternative embodiment that uses multi-feeds or multi-channels, the final measurement and estimation can allow for differential measurements (amplitude and/or phase). Also, the final measurement and estimation function would allow for a more accurate parameter estimation of the absolute channel in such a multi-channel system.

In another alternative embodiment that uses multi-feeds or multi-channels, the final measurement and estimation can allow for cross correlation measurements (power, amplitude and/or phase). Also the final measurement and estimation function would allow for a more accurate parameter measurement in such a multi-channel system.

In other alternative embodiments, the signal processed may be in different formats such as digital, analog, or both or the system may be implemented as part of a wireless or wired system.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A system for determining parameters of a signal, comprising:
    a front end for receiving the signal;
    a channelizer connected to said front end to segment the signal into a plurality of signal segments;
    a plurality of detectors connected to said channelizer, each of said detectors corresponding to at least one of said signal segments;
    a plurality of delays connected to said channelizer, wherein each said delay is associated with at least a corresponding one of said plurality of detectors; and
    a plurality of parameter measurement units wherein each said parameter measurement unit is connected to at least a corresponding one of said plurality of detectors and to said delay associated with said at least one detector;
    wherein at least one of said parameter measurement units comprises:
        an adaptive signal arbitration control unit;
        a pre-filter tuner; and
        a signal parameter measurement and estimation unit;
    wherein said adaptive signal arbitration control unit sends information about the corresponding at least one of said signal segments to said pre-filter tuner and sends control information to said signal parameter measurement and estimation unit and wherein said pre-filter tuner sends a narrow band signal and a wide band signal to said signal parameter measurement and estimation unit.

2. The system of claim 1 wherein each of said plurality of detectors generates time and frequency information about the corresponding signal segment for use by the corresponding parameter measurement unit.

3. The system of claim 2 wherein said adaptive signal arbitration control unit uses time and frequency information of said signal segment to isolate said signal segment into at least one separate signal; prioritizes said at least one separate signal using a user-supplied priority scheme; determines adaptive tuning, bandwidth and gain information of the highest priority signal; and configures said pre-filter tuner using said adaptive tuning, bandwidth and gain information.

4. The system of claim 3 wherein said adaptive signal arbitration control unit, in configuring said pre-filter tuner using said adaptive tuning, bandwidth and gain information, configures a tuning mechanism with adaptive tuning information from said adaptive tuning, bandwidth, and gain information; configures a filter bandwidth with bandwidth information from said adaptive tuning, bandwidth, and gain information and a user supplied factor dependent upon the parameters to be measured; and configures a filter gain with gain information from said adaptive tuning, bandwidth and gain information.

5. The system of claim 1 wherein at least one of said parameter measurement units uses time and frequency information from at least one of said detectors to adaptively configure said parameter measurement unit's processing bandwidth.

6. The system of claim 1 wherein said signal parameter measurement and estimation unit comprises:
    an initial detection and measurement unit; and
    a final measurement and estimation unit;
    wherein said initial detection and measurement unit uses a wideband signal to determine an arrival time of the signal and said final measurement and estimation unit uses said arrival time to control a final parameter measurement using a separate narrowband signal.

7. The system of claim 1 wherein said pre-filter tuner comprises a filter and wherein said pre-filter tuner frequency shifts said signal segment and then passes said signal segment through said filter.

8. The system of claim 1 wherein said pre-filter tuner comprises at least two filters, wherein said pre-filter tuner frequency shifts the corresponding signal segment and splits the corresponding signal segment into at least two instances and wherein each instance passes through one of said at least two filters.

9. The system of claim 8 wherein a first of said at least two instances passes through one of said at least two filters and the other of said at least two instances passes through another of said at least two filters.

10. The system of claim 1 wherein said signal parameter measurement and estimation unit comprises:
    a delay that receives the narrow band signal;
    an initial measurement unit that processes the wide band signal; and
    a final measurement unit that processes information received from said initial measurement unit and the narrow band signal from said delay based on the control information to produce signal parametrics about the signal segment.

11. A system for processing a signal, comprising:
    a signal arbitration control unit that receives information about the signal and has control information;
    a pre-filter tuner that receives the signal; and
    a measurement unit coupled to said pre-filter tuner;
    wherein said signal arbitration control unit uses time and frequency information about said signal to isolate said signal into at least one separate signal; prioritizes said at least one separate signal using a user-supplied priority scheme; determines adaptive tuning, bandwidth and gain information of the highest priority signal; and configures said pre-filter tuner using said adaptive tuning, bandwidth and gain information; and
    wherein said pre-filter tuner comprises at least two filters, wherein said pre-filter tuner frequency shifts the signal, then splits the signal into at least two instances, wherein a first of said at least two instances passes through a first of said at least two filters and wherein a second of said at least two instances passes through a second of said at least two filters.

12. The system of claim 11 wherein said signal arbitration control unit, in configuring said pre-filter tuner using said adaptive tuning, bandwidth and gain information, configures a tuning mechanism with adaptive tuning information from said adaptive tuning, bandwidth, and gain information; configures a filter bandwidth with bandwidth information from said adaptive tuning, bandwidth, and gain information and a user-supplied factor dependent upon the parameters to be measured; and configures a filter gain with gain information from said adaptive tuning, bandwidth and gain information.

13. The system of claim 11 wherein said at least one separate signal comprises a plurality of separate signals.

14. The system of claim 11 wherein said signal arbitration control unit is coupled to said measurement unit and said signal arbitration control unit further uses time information about said signal to determine timing gate information of the highest priority signal and configures said measurement unit using said timing gate information.

15. A system for processing a signal, comprising:
a signal arbitration control unit that receives information about the signal and has control information;
a pre-filter tuner that receives the signal; and
a measurement unit;
wherein said signal arbitration control unit uses time and frequency information about said signal to isolate said signal into at least one separate signal; prioritizes said at least one separate signal using a user-supplied priority scheme; determines adaptive tuning, bandwidth and gain information of the highest priority signal; and configures said pre-filter tuner using said adaptive tuning, bandwidth and gain information;
wherein said pre-filter tuner sends a narrow band signal and a wide band signal to said measurement unit; and
wherein said measurement unit comprises:
a delay that receives the narrow band signal;
an initial measurement unit that processes the wide band signal; and
a final measurement unit that processes information received from said initial measurement unit and the narrow band signal from said delay based on the control information to produce signal parametrics about the signal.

16. The system of claim 15 wherein said signal arbitration control unit, in configuring said pre-filter tuner using said adaptive tuning, bandwidth and gain information, configures a tuning mechanism with adaptive tuning information from said adaptive tuning, bandwidth, and gain information; configures a filter bandwidth with bandwidth information from said adaptive tuning, bandwidth, and gain information and a user-supplied factor dependent upon the parameters to be measured; and configures a filter gain with gain information from said adaptive tuning, bandwidth and gain information.

17. The system of claim 15 wherein said at least one separate signal comprises a plurality of separate signals.

18. A system for processing a signal, comprising:
a signal arbitration control unit that receives information about the signal and has control information;
a pre-filter tuner that receives the signal; and
a measurement unit coupled to said pre-filter tuner;
wherein said signal arbitration control unit uses time and frequency information about said signal to isolate said signal into at least one separate signal; prioritizes said at least one separate signal using a user-supplied priority scheme; determines adaptive tuning, bandwidth and gain information of the highest priority signal; and configures said pre-filter tuner using said adaptive tuning, bandwidth and gain information; and wherein said measurement unit comprises:
an initial detection and measurement unit; and
a final measurement and estimation unit;
wherein said initial detection and measurement unit uses a wideband signal to determine an arrival time of the signal and said final measurement and estimation unit uses said arrival time to control a final parameter measurement using a separate narrowband signal.

19. The system of claim 18 wherein said signal arbitration control unit, in configuring said pre-filter tuner using said adaptive tuning, bandwidth and gain information, configures a tuning mechanism with adaptive tuning information from said adaptive tuning, bandwidth, and gain information; configures a filter bandwidth with bandwidth information from said adaptive tuning, bandwidth, and gain information and a user-supplied factor dependent upon the parameters to be measured; and configures a filter gain with gain information from said adaptive timing, bandwidth and gain information.

20. The system of claim 18 wherein said at least one separate signal comprises a plurality of separate signals.

21. A system for processing a signal, comprising:
a signal arbitration control unit that receives information about the signal and has control information;
a pre-filter tuner that receives the signal; and
a measurement unit coupled to said pre-filter tuner;
wherein said signal arbitration control unit uses time and frequency information about said signal to isolate said signal into at least one separate signal; prioritizes said at least one separate signal using a user-supplied priority scheme; determines adaptive tuning, bandwidth and gain information of the highest priority signal; and configures said pre-filter tuner using said adaptive tuning, bandwidth and gain information;
wherein said pre-filter tuner comprises a filter, wherein said pre-filter tuner frequency shifts the signal and then passes the signal through said filter; and
wherein said signal arbitration control unit is coupled to said measurement unit and said signal arbitration control unit further uses time information about said signal to determine timing gate information of the highest priority signal and configures said measurement unit using said timing gate information.

22. The system of claim 21 wherein said signal arbitration control unit sends to said pre-filter tuner only the information about the signal needed to continue processing the signal.

23. The system of claim 21 wherein said signal arbitration control unit, in configuring said pre-filter tuner using said adaptive tuning, bandwidth and gain information, configures a tuning mechanism with adaptive tuning information from said adaptive tuning, bandwidth, and gain information; configures a filter bandwidth with bandwidth information from said adaptive tuning, bandwidth, and gain information and a user-supplied factor dependent upon the parameters to be measured; and configures a filter gain with gain information from said adaptive tuning, bandwidth and gain information.

24. The system of claim 21 wherein said at least one separate signal comprises a plurality of separate signals.

* * * * *